United States Patent

[11] 3,573,637

[72] Inventor Jerald T. Stebbins
 San Diego, Calif.
[21] Appl. No. 843,402
[22] Filed July 22, 1969
[45] Patented Apr. 6, 1971
[73] Assignee Stromberg DatagraphiX, Inc.
 San Diego, Calif.

[54] TIMING SYSTEM WITH OUTPUT REPRESENTING PREDETERMINED AND CONSTANT PHASE DISPLACEMENT FROM VARIABLE FREQUENCY INPUT
 16 Claims, 4 Drawing Figs.
[52] U.S. Cl................................................. 328/114,
 328/134, 328/141, 307/218, 307/228, 328/147,
 328/55
[51] Int. Cl..................................................... H03k 5/20
[50] Field of Search........................................... 328/55,
 114, 134, 141, 147; 307/236, 218, 228

[56] References Cited
 UNITED STATES PATENTS
 3,054,064 9/1962 Sherman...................... 328/141X
 3,091,738 5/1963 Relis et al. .................. 328/114X
 3,331,030 7/1967 Jordan et al. ................ 328/134X
 3,505,537 4/1970 Giordano..................... 307/236X
 3,515,997 6/1970 Babany........................ 328/134

Primary Examiner—John B. Heyman
Attorneys—Martin Lu Kacher and John R. Duncan

ABSTRACT: Systems are described for generating timing pulses having frequencies which follow a driving signal such that the difference between the frequency of the timing pulses and the driving signal remains constant even with variations in the driving signal frequency. A sinusoidal driving signal and a triangular waveform having a frequency equal to the desired difference between the input driving signal and the output pulse train are compared so as to provide outputs corresponding to the crossovers therebetween. Pulse selection logic which is enabled in accordance with the slope of the triangular waveform provides the output pulses which may have output frequencies equal either to the sum of the input and the triangular wave frequency or the difference therebetween.

Patented April 6, 1971 3,573,637

INVENTOR.
JERALD T. STEBBINS

BY M. L. Roden ATTY

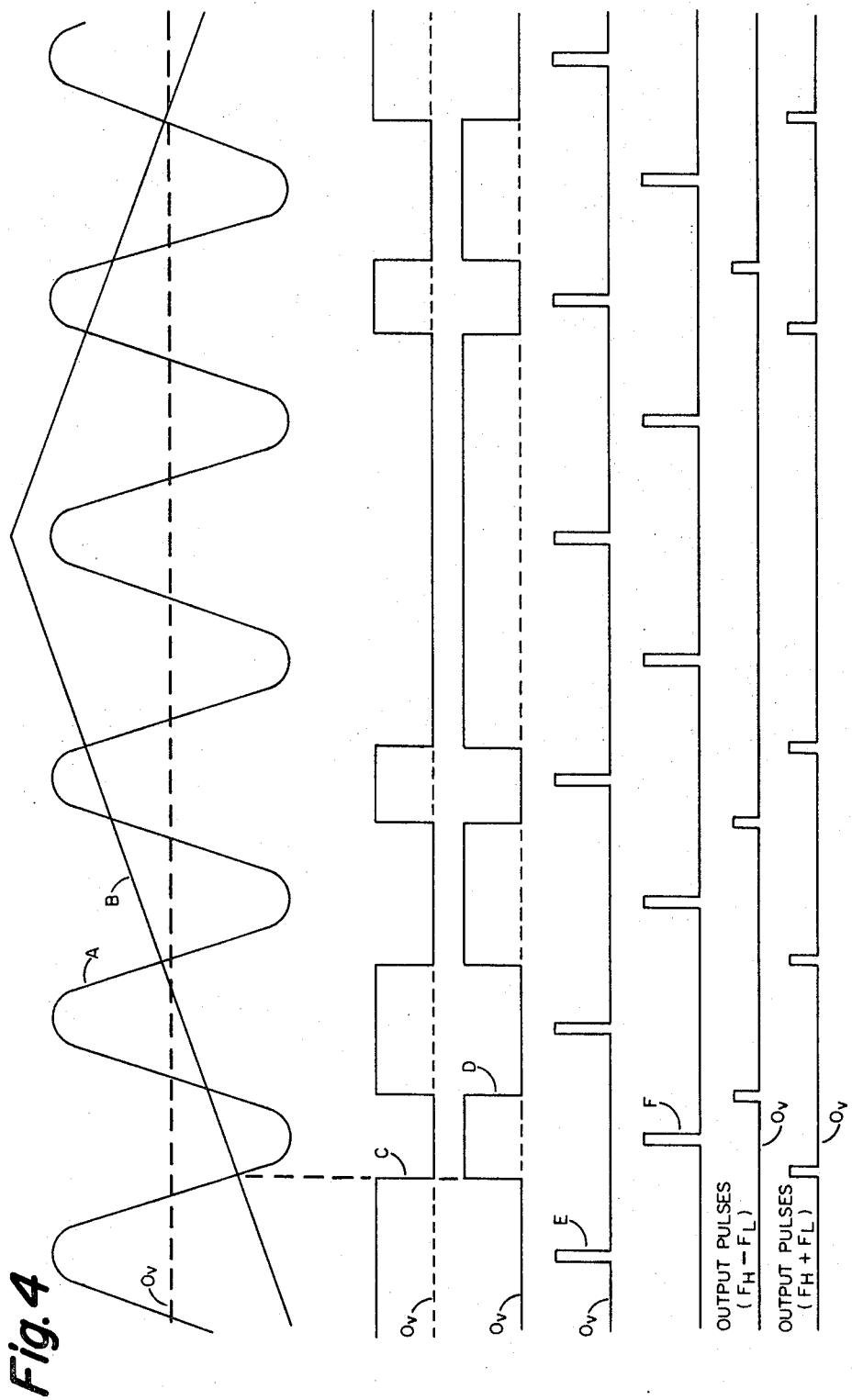

TIMING SYSTEM WITH OUTPUT REPRESENTING PREDETERMINED AND CONSTANT PHASE DISPLACEMENT FROM VARIABLE FREQUENCY INPUT

The present invention relates to timing systems and particularly to systems for generating output signals that follow an input signal so as to remain separated therefrom by a predetermined frequency in spite of variations in the input signals frequency.

The invention herein described was made in the course of or under a contract with the Department of the Navy.

The invention is especially suitable for use in vibration analysis for providing timing pulses for operating a stroboscope in desired time relationship with a vibration driving signal which may vary or sweep in frequency. The invention, however, is generally applicable to control systems as well as other systems where timing pulses or other signals which follow an input signal in frequency are desired.

The problem of providing an output signal which follows an input signal in frequency by a very small frequency difference, say only a few Hertz, especially at low frequencies as occur in vibration analysis (e.g. 5 Hz. to 500 Hz.) has been a very difficult one. Frequency generation through the use of heterodyning techniques or mixing is generally impractical at low frequencies. Even at higher frequencies, the separation of the desired signal requires precise, expensive filters and may not be practical to implement, if the desired and spurious signals are very close in frequency to each other. Frequency division and multiplication techniques are limited to applications where the input and desired signals may be integral multiples or submultiples of each other. The frequency separation between these signals is generally too far apart to be useful for many purposes, such as vibration analysis by stroboscopic techniques. Counters which work with the decoding logic for subtracting and adding pulses selectively have been suggested. Such systems are however quite complex and not readily controlled to provide such alteration in the desired frequency separation between the output and input signals as may be necessary in practice.

Accordingly, it is an object of the present invention to provide an improved system for generating timing signals which are separated in frequency from an input signal by a predetermined frequency.

It is another object of the present invention to provide an improved system for synthesizing frequencies which are separated from an input frequency by a constant frequency difference even though the input frequency may be variable.

It is still another object of the present invention to provide an improved frequency follower system which generates output signals having a constant frequency separation from an input signal, even though that frequency separation may be a few Hertz and perhaps even 1 Hz. or a fraction of a Hertz.

Briefly described, a system embodying the invention includes means for comparing the waveform of an input signal and another signal having a frequency equal to the desired frequency separation between the input signal and the output signal. Selection logic, as may include digital elements, are responsive to the results of the waveform comparison for providing the desired output signals.

The invention itself, both as to its organization and method of operation, as well as additional objects and advantages thereof will become more readily apparent from a reading of the following description in connection with the accompanying drawings in which:

FIG. 4 is a timing diagram showing waveforms and pulses generated during the operation of the system shown in FIG. 3.

Figure 1:
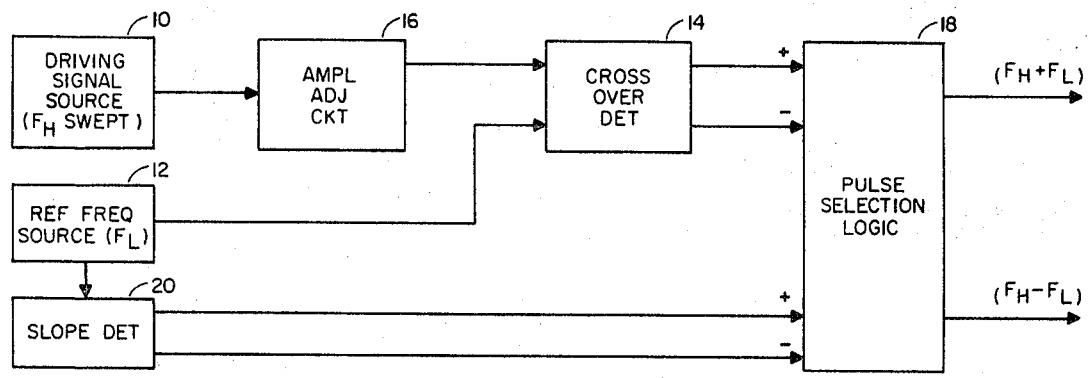
FIG. 1 is a simplified block diagram of a system embodying the invention.

Referring first to FIG. 1, the input signal to the system is shown as being obtained from a driving signal source 10. This signal may be obtained from a transducer which is attached to a vibration table. Suitable amplifiers may also be included in the source 10. The signal is indicated as having a frequency of "$F_H$ swept" to denote that the frequency may be varied, as may occur during vibration testing. The waveform of the driving signal from source 10 may be sinusoidal.

Another source of signals 12 indicated as a reference frequency source produces triangular waveform output signals having a constant frequency $F_L$. This frequency $F_L$ is chosen to be equal to the frequency separation between the desired output signal and the driving signal. In the case of vibration analysis the frequency $F_L$ may be 1 Hz. The waveform of the reference signal and the driving signal are compared in a crossover detector 14. The waveforms of the signals applied to the detector should be approximately equal in amplitude so there will be no long interval during which no crossovers occur during each cycle of the triangular waveform. To this end an amplitude adjusting circuit 16 is included in the signal path from the driving signal source to the detector 14. This circuit may be an automatic gain control circuit which preserves the waveform of the signal. If the driving signal is constant in amplitude, the circuit 16 may of course be omitted.

The crossover detector 14 may include a comparator circuit which produces an output pulse each time the reference signal and the driving signal are of equal amplitude. The output of the detector 14 indicated by the plus carries the positive crossovers, that is, the pulses which occur when the driving signal is going positive or has a positive slope. The crossover detector output indicated by the minus represents the negative crossovers, (that is, the pulses produced when the driving signal is going negative or has a negative slope).

Pulse selection logic 18 is provided for selecting either those crossovers occurring when the driving signal and the reference signal have the same slope (viz. both positive or both negative) or those crossovers which occur when the driving signal and the reference signal have opposite slopes (viz. one positive and the other negative or vice versa). To this end a slope detection circuit 20 is provided. The outputs of this circuit indicated as plus and minus have different operating levels when the slope of the reference signal is positive and negative respectively. The slope detector may be included in the reference frequency source or may be any suitable circuit, such as a differentiating circuit, which senses the reference frequency signal so as to derive output levels representing its slope. When included in the reference frequency source 12, the slope detector may be provided by the control circuit which determines the frequency of the triangular wave as will be explained more fully connection with FIG. 2 and FIG. 3 of the drawings.

The pulse selection logic 18, which may include digit gates of the type to be described more fully hereinafter, may be wired to select the like slope crossovers of like slope sign. It can be seen in FIG. 4 that the crossovers of like sign occur at a later phase in the sine wave cycle with each successive occurrence. Since the period between successive pulses is therefore slightly greater than 1 sine wave period, there are fewer pulses than sine waves over any extended interval of time. Accordingly, the output signal will be a pulse train having a frequency equal to $F_H - F_L$.

The converse is true when the pulse selection logic 18 is wired to select crossovers of unlike slopes. Then the crossovers occur at an earlier phase in the sine wave cycle upon each successive occurrence, the period between successive pulses is slightly less than 1 sine wave period, and the number of pulses exceeds the number of sine wave cycles in any extended interval of time. The output signal will than be a pulse train having a frequency $F_H + F_L$.

Figure 2:
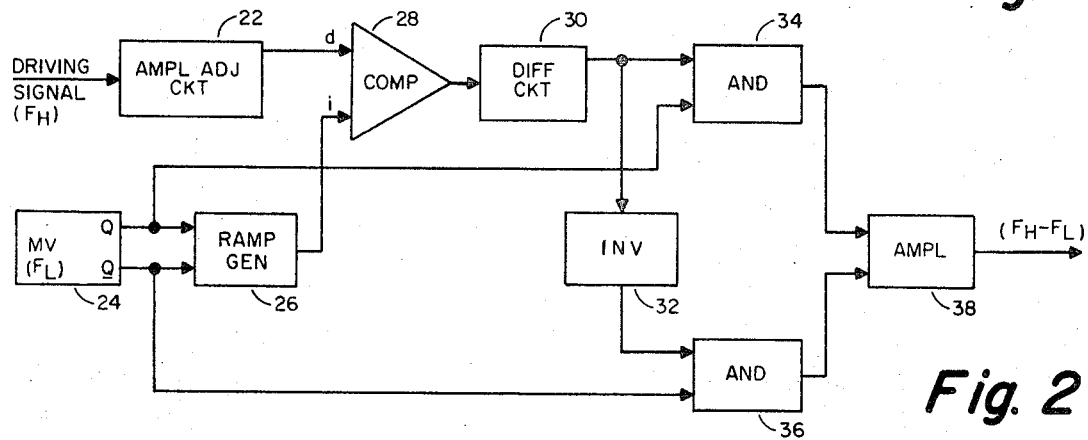
FIG. 2 is a more detailed block diagram showing the system in FIG. 1 in greater detail.

In FIG. 2 the driving signal is applied to an amplitude adjusting circuit 22 which performs the functions mentioned in connection with the circuit 16 shown in FIG. 1.

The reference frequency generator includes a free running or astable multivibrator 24 which operates at the desired separation frequency $F_L$. This multivibrator drives a ramp generator 26 which may include a charging circuit which charges a capacitor towards a positive voltage when the Q output of the multivibrator is high and towards a negative voltage when the $\bar{Q}$ output is high. The slope of the triangular wave is positive when the multivibrator Q output is high and negative when the Q output is low. Accordingly these outputs directly indicate the slope of the triangular wave. The triangular waveform so generated and the sinusoidal driving signal are respectively applied to inverting ($i$) and direct ($d$) inputs of a comparator circuit 28 which may be a differential amplifier, such as an operational amplifier. The output of the comparator is a rectangular wave with abrupt transitions. A differentiating circuit 30 generates positive pulses and negative pulses from the rectangular wave, corresponding in time with the positive and negative crossovers which result when the driving signal and the reference are of equal amplitude. The positive pulses correspond in time with the positive crossovers. An inverter 32 provides positive pulses at the output thereof, corresponding in time with the negative crossovers.

The pulse selection logic is provided by a pair of AND gates 34 and 36 which respectively pass the pulses at positive crossover time when the slope of the reference wave is positive and the pulses at negative crossover time when the slope of the reference wave is negative. AND gate 34 is insensitive to the positive pulses present on the output of differentiating circuit 30. An amplifier 38 performs an OR gate function and provides a train of output pulses having a frequency $F_H - F_L$ the output frequency follows the frequency of the driving signal but is always separated therefrom by the constant reference frequency $F_L$. It will be apparent that this constant frequency separation exists notwithstanding that the driving signal may vary in frequency. By reversing the outputs of the multivibrator 24 applied to the AND gates 34 and 36, the output frequency provided will be $F_H + F_L$.

Figure 3:
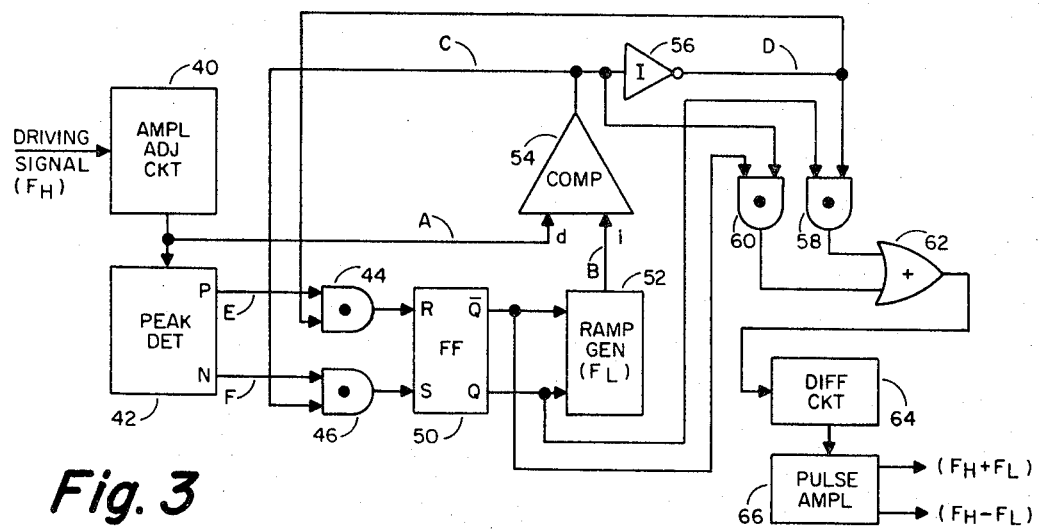
FIG. 3 is a block diagram showing a system similar to the system shown in FIG. 1 which also embodies the invention.

FIG. 3 shows a frequency synthesizer system wherein the reference signal is synchronized with the driving signal. As in the case of the systems described in connection with FIGS. 1 and 2, the driving signal may be passed through an amplitude adjusting circuit 40. Synchronization is provided by generating the successive slopes of the triangular wave in synchronism with the peaks of the sinusoidal driving signal. To this end the reference frequency generator includes peak detector circuit 42 which provides two outputs indicated as $p$ and $n$ and shown on waveforms E and F of FIG. 4. The circuit may for example include a differential amplifier to one input of which the driving signal is directly applied and to the other input of which the driving signal is applied after being shifted in phase by a few degrees, as in an RC circuit. The output of the differential amplifier is a square wave having alternate negative and positive transitions which correspond in time to the positive peak and the negative peak of the driving signal. This square wave may be differentiated and inverted to provide positive pulses as indicated by waveform E corresponding to the positive peaks and positive pulses as indicated in waveform F corresponding to the negative peaks.

These pulses are gated through digital logic including a pair of AND gates 44 and 46 to trigger a flip-flop 50. The flip-flop 50 drives a ramp generator 52 as was explained in connection with FIG. 2. The ramp generator produces the triangular wave B which is compared with the input driving signal A in a comparator circuit 54 also as was explained in connection with FIG. 2. The comparator circuit 54 produces an output indicated at waveform C of FIG. 4 which is at a positive level only when the sinusoidal driving signal is more positive than the triangular wave. This signal may be inverted in an inverter circuit 56, the output of which is a positive level only when the triangular wave is more positive than the sine wave. When the latter situation occurs, the gate 44 is enabled thereby causing the flip-flop 50 to be reset by the next pulse corresponding to a positive peak in the driving signals. The triangular wave then has a negative slope. Similarly the first pulse corresponding to a negative peak in the driving signal which occurs when the driving signal is more positive than the reference triangular wave causes the flip-flop 50 to be set and the triangular wave then has a positive slope. Successive half cycles of the reference signal are therefore coincident with integral numbers of half cycles of the driving signal. Thus the reference frequency is an integral submultiple of the driving frequency.

The reference frequency may be selected approximately by selecting the charging voltage in the ramp generator 52 or the values of the timing components in the charging circuits. The exact frequency will be locked to an odd submultiple of the driving frequency. The circuit also affords some AGC action since the amplitude of the triangular wave stays approximately equal to (although slightly greater than) the amplitude of the sine wave even if the sine wave amplitude varies somewhat. This action prevents the possibility of a long interval without crossovers within each period of the triangular wave. The AGC action also permits the reference frequency to be controlled by varying the amplitude of the driving signal A, since the time duration of each ramp of the triangular wave is a function of its amplitude if the slope is held constant.

Pulse selection is accomplished by digital logic including a pair of AND gates 56 and 60 and an OR gate 62. Waveform C is applied to the input of a differentiating circuit 64 during the negative slope of the triangular wave, while waveform D is applied thereto during the positive slope of the wave. The differentiating circuit therefore provides positive pulses corresponding to $F_H + F_L$ and negative pulses corresponding to $F_H - F_L$. A pulse amplifier 66 having separate channels for the positive and negative pulses therefore produces output pulse trains having frequencies following the driving signal frequency which are greater and lower than that of the driving signal (viz. $F_H + F_L$ and $F_H - F_L$).

As mentioned above, the pulses generated by the system may be used as timing pulses for the stroboscope of vibration analysis equipment. The strobe light then flashes at a frequency slightly lower than the vibration frequency. Each successive flash then occurs at a slightly different phase in the vibration cycle. The apparent movement of the vibrating part (viz. the deflection thereof) while under test may then readily be observed at the difference frequency even though the frequency of vibration is varied or swept during the vibration test.

In addition to the application mentioned above for vibration analysis, the invention also provides a frequency synthesizer which produces output frequencies separated by a constant frequency difference from an input frequency which may be variable. Thus the invention will have application in control systems, data transmission and voice scrambling applications, especially where the frequency differences between input and output signals is small or the frequencies involved are low.

While different embodiments of the invention have been described herein, the description is intended to clearly illustrate the invention. Variations and modifications of the herein described systems within the scope of the invention may suggest themselves to those skilled in the art. Accordingly, the foregoing description should be taken as illustrative and not in any limiting sense.

I claim:
1. A system for generating a second signal having a predetermined frequency separation with respect to a first signal, said system comprising:
   a. a source of third signals having a frequency equal to said separation;
   b. means operative upon at least one of said first and third signals for providing said first and third signals approximately equalized in amplitude;
   c. means responsive to said equalized signals for providing first and second outputs corresponding to the crossovers between said first and third equalized signals while they are varying in the positive sense and the negative sense, respectively;
   d. means for selecting at least one of said first and second outputs, thereby generating said second signal.

2. A system for generating a second signal having a predetermined frequency separation with respect to a first signal, said system comprising:

a. a source of third signals having a frequency equal to said separation;
b. means operative upon at least one of said first and third signals for providing said first and third signals approximately equalized in amplitude;
c. means responsive to said equalized signals for providing first and second outputs corresponding to the crossovers between said equalized signals while said first signal is varying in a positive sense and a negative sense, respectively;
d. means for providing a third output indicative of the sense of the variation of said third signal; and
e. means responsive to said third output and to said first and second outputs for alternately selecting one of said first and second outputs, thereby generating said second signal.

3. The invention as set forth in claim 2 wherein said first signal is a sinusoidal wave and said third signal is a triangular wave.

4. The invention as set forth in claim 3 wherein said triangular wave is lower in frequency than said sinusoidal wave.

5. The invention as set forth in claim 4 wherein said triangular wave frequency is less than 5 Hz.

6. The invention as set forth in claim 2 wherein said first signal is variable in frequency.

7. The invention as set forth in claim 2 including means coupled to said third signal for providing a binary third output, said third output having first and second levels when the third signal is varying in the positive sense and the negative sense respectively, wherein said equalized signal responsive means include means for providing said first and second outputs as the positive pulses and the negative pulses respectively of a bipolar pulse train.

8. The invention as set forth in claim 2 including means for generating said third signal in synchronism with said first signal.

9. The invention as set forth in claim 8 wherein means are included in said generating means for producing said second signal with a frequency which is an integral submultiple of said first signal frequency.

10. The invention as set forth in claim 9 wherein said third signal is a triangular wave.

11. The invention as set forth in claim 2 including:
a. means coupled to said third signal for providing a binary third output, said third output having first and second levels when the third signal is varying in the positive sense and the negative sense respectively;
b. wherein said equalized signal responsive means include means for providing said first and second outputs as complementary binary signals; and
c. wherein said selecting means includes means for generating pulses from the first and second outputs, and said pulses comprise the second signal.

12. A system for generating output pulses having a frequency which differs from the frequency of an input signal by a certain frequency, which system comprising:
a. means for generating a reference signal having a frequency equal to said certain frequency;
b. means operative to equalize said signals approximately in amplitude;
c. a comparator for providing a first output having a first level when said equalized input signal is positive with respect to said reference signal and a second level when said equalized input signal is negative with respect to said reference signal, the transitions between said levels occurring at the crossovers between said input and reference signals;
d. means for providing a second output having a first level when said reference signal is increasing and a second level when said reference signal is decreasing; and
e. means including logic circuits and responsive to said first and second outputs for selectively producing pulses corresponding either
  i. to the transitions in said first output from its said first level to its said second level when said second output is of said first level and to the transitions in said first output from its said second level to its first level when said second output is of said second level or
  ii. to the transition in said first output from said second level to said first level when said second output is of said first level and to the transitions in said first output from said first level to its said second level when said first output is of said second level.

13. The invention as set forth in claim 12 wherein said last-named means includes a differentiating circuit for translating said transitions into said output pulses.

14. The invention as set forth in claim 12 wherein said reference signal generating means includes a ramp generator for generating a triangular wave.

15. The invention as set forth in claim 14 including a multivibrator for driving said ramp generator to produce the increasing and decreasing amplitude portion of said triangular wave when said multivibrator is in its first and second states, respectively, said multivibrator also comprising said means for producing said second output.

16. The invention as set forth in claim 14 including in said reference signal generating means
a. a peak detector responsive to said input signal for providing pulses at the positive and negative peaks thereof;
b. a flip-flop for driving said ramp generator to produce the increasing and decreasing portion of said reference signal when said flip-flop changes state; and
c. gating means responsive to said first output for enabling the passage of said pulses corresponding to said positive and negative peaks alternately for triggering said flip-flop.